(12) United States Patent
Laurent et al.

(10) Patent No.: US 6,172,304 B1
(45) Date of Patent: Jan. 9, 2001

(54) DEVICE FOR PROVIDING LEAKPROOF PROTECTION TO A SPLICE IN A HIGH VOLTAGE CABLE

(75) Inventors: Michel Laurent; Heinz Hahn, both of Morges (CH)

(73) Assignee: Alcatel, Paris (FR)

( * ) Notice: Under 35 U.S.C. 154(b), the term of this patent shall be extended for 0 days.

(21) Appl. No.: 09/166,795

(22) Filed: Oct. 6, 1998

(30) Foreign Application Priority Data

Oct. 7, 1997 (FR) .................................................. 97 12511

(51) Int. Cl.⁷ .................................................. H02G 15/02
(52) U.S. Cl. ................... 174/74 R; 174/74 A; 174/84 R
(58) Field of Search .............................. 174/74 R, 74 A, 174/78, 84 R, 89

(56) References Cited

U.S. PATENT DOCUMENTS

| 1,723,846 | 8/1929 | Eby . | |
|---|---|---|---|
| 4,110,550 | 8/1978 | Di Pietro | 174/19 |
| 4,580,874 | * 4/1986 | Winter et al. | 350/96.21 |
| 4,786,760 | * 11/1988 | Fiedhelm | 174/84 R |
| 4,885,432 | * 12/1989 | Amoyal et al. | 174/92 |
| 5,661,842 | * 8/1997 | Faust | 385/139 |
| 5,844,170 | * 12/1998 | Chor et al. | 174/74 A |
| 5,900,585 | * 5/1999 | Winfield et al. | 174/74 A |

FOREIGN PATENT DOCUMENTS

| 1465809 | * 5/1969 | (DE) . |
| 0 255 784 A2 | 6/1987 | (EP) . |
| 0 475 561 A1 | 3/1992 | (EP) . |
| 0 780 949 A1 | 6/1997 | (EP) . |

* cited by examiner

Primary Examiner—Kristine Kincaid
Assistant Examiner—William H. Mayo, III
(74) Attorney, Agent, or Firm—Sughrue, Mion, Zinn, Macpeak & Seas, PLLC

(57) ABSTRACT

The invention relates to a leakproof protection device for a high voltage cable splice. The device comprises two elements that are prefabricated in a factory. The element comprises a copper tube in the form of a first cylindrical segment which matches the diameter of a cable that is to be spliced, a second cylindrical segment of a diameter that matches a splice body, and an interconnecting conical segment. A preformed insulating covering covers the metal tube in part and is secured thereto. The second element also has a copper tube and a preformed insulating element of synthetic material. The two elements are assembled together in leakproof by welding together the ends of the two tubes and by coupling together their coverings.

12 Claims, 5 Drawing Sheets

DEVICE FOR PROVIDING LEAKPROOF PROTECTION TO A SPLICE IN A HIGH VOLTAGE CABLE

The present invention relates to a device for providing leakproof protection to a splice in a high voltage cable, the device comprising at least one tubular metal structure and at least one outer insulating sheath.

BACKGROUND OF THE INVENTION

Protection devices of this type are already known which comprise coverings made up of numerous parts that the operative must assemble on the site where the cable is being installed. The parts comprise copper or lead tubes that the operative must weld or screw together, rings of brass, bronze, or insulating material, gaskets that may be toroidal or flat, boxes made of fiberglass reinforced epoxy resin, connection equipment, fasteners, heat-shrink sheaths, mastic, and a large quantity of filler for casting on site.

Such coverings are expensive, difficult to assemble, and the extent to which they are leakproof depends mainly on the skill of the operative.

OBJECTS AND SUMMARY OF THE INVENTION

The present invention seeks to remedy those drawbacks by providing a protection device for a high voltage cable splice that is constituted by a minimum number of elements, which elements are entirely prefabricated in the factory.

Prefabrication means that it is possible in the factory to perform a high degree of quality control concerning electrical, visual, and dimensional characteristics, thereby greatly simplifying the assembly operations that need to be performed on site.

To this end, the leakproof detection device of the invention comprising a tubular metal structure and an outer insulating sheath is constituted by first and second prefabricated elements having a zone of mutual leakproof connection and each comprising at least one first tube and an outer preformed covering secured to each tube of the prefabricated element, the tubes of said assembled-together prefabricated elements, together constituting said tubular metal structure and their respective preformed coverings, are coupled together in leakproof manner in said connection zone, thereby constituting said outer insulating sheath.

In a preferred embodiment, said first tube of one of said prefabricated elements has a flare at one of its ends, thereby enabling it to be engaged on one of the ends of said first tube of the other of said prefabricated elements, and enabling said mutually engaged ends to be welded together. Advantageously, the tubes are made of copper and are made using copper sheet that is rolled and welded. Preferably, the preformed coverings are adapted to the profiles of the respective tubes and are made of synthetic material by rotational molding.

Advantageously, the two preformed coverings are coupled together by means of an extra part which covers the connection zone between said first tubes and which is linked in leakproof manner to each of the two coverings.

In a first embodiment, there is only one first tube in each of said prefabricated elements, each of said tubes comprising two opposite cylindrical segments interconnected by a conical segment, said connection zone between said prefabricated elements being at the terminal end of the larger-diameter cylindrical segment of each of the first tubes.

In this embodiment, one of the cylindrical segments has a diameter that matches that of a cable to be connected, and the other cylindrical segment matches the diameter of a splice body.

In an advantageous second embodiment, there is only one first tube in said first prefabricated element, which tube has two circularly cylindrical segments of different diameters with a conical segment between them, while the second prefabricated element comprises said first tube thereof and a second tube, both tubes being cylindrical but of different diameters and being mounted substantially one after the other, the tubes being insulated from each other and both of them carrying said preformed covering of said second prefabricated element.

Advantageously, said first and second tubes of said second prefabricated element have two facing ends, each having a conical extension at the same angle and leaving a space between them.

In which case, the space between said first and second tubes of the second element is filled with an insulating material.

Also, the two tubes are respectively associated with means for connection to external local grounding cables for each of them or for permutating shields.

BRIEF DESCRIPTION OF THE DRAWINGS

The present invention and its advantages will be better understood on reading the following description of non-limiting embodiments given with reference to the accompanying drawings, in which.

DETAILED DESCRIPTION OF THE INVENTION

Figure 1:
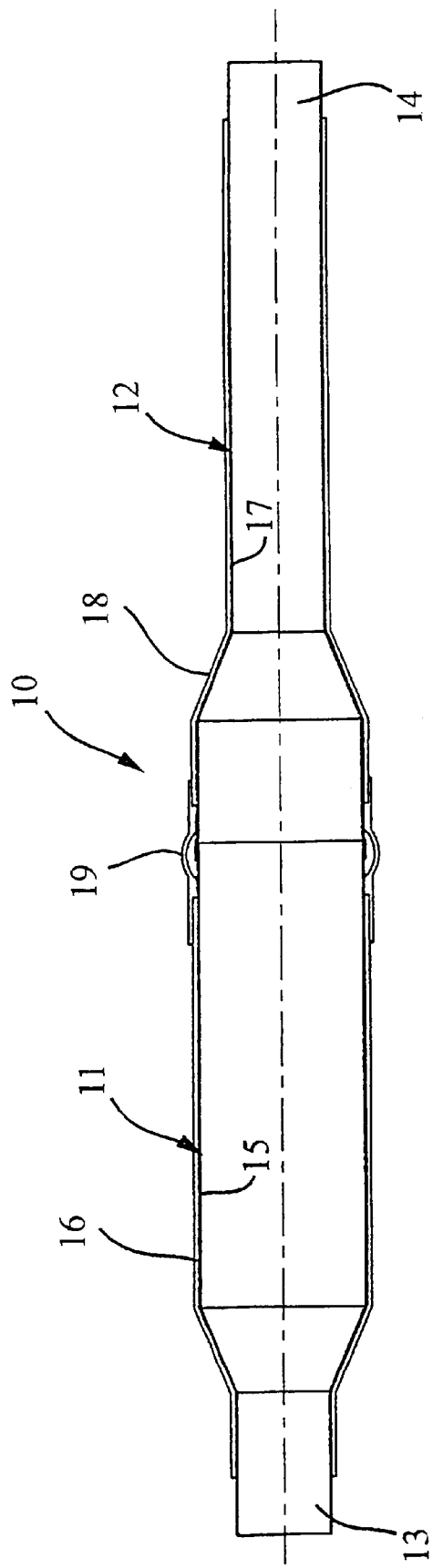
FIG. 1 is an overall view of a first embodiment of the leakproof protection device of the invention for a high voltage cable splice.

With reference to the figures, and in particular to FIG. 1, the leakproof protection device for a high voltage cable splice 10 mainly comprises two elements 11 and 12 which are mounted respectively on two cables 13 and 14 that are then spliced together by means of a prefabricated splice body which is not shown or described since it does not form part of the present invention. The two elements 11 and 12 are assembled together in leakproof manner by means of a method that is described below.

Figure 2:
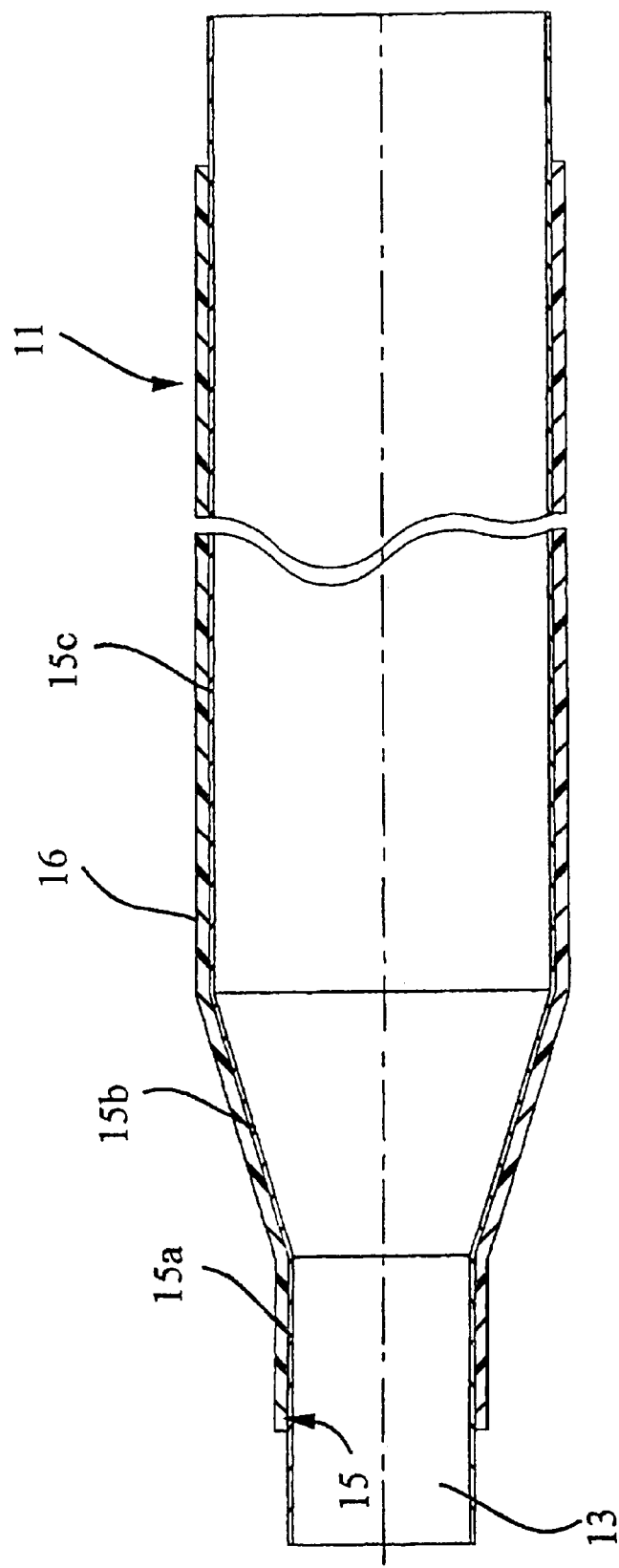
FIG. 2 is a section view on a larger scale of the first element of the FIG. 1 device.

The element 11 is shown on a larger scale in FIG. 2. It mainly comprises a copper tube 15 and a protective covering 16 made of an insulating synthetic material that covers the copper tube 15, at least in part. The tube 15 comprises a cylindrical portion 15a of circular section and of a length enabling it to cover and protect the portion of the cable that it has been necessary to strip for engagement purposes during the operation of connecting the conductors in the prefabricated splice body. The diameter of this portion matches the diameter of the cable 13. This portion is extended by a second portion 15b of conical shape and by a third portion 15c in the form of a circular cylinder of diameter greater than that of the first portion 15a and which matches the outside diameter of the splice body.

The copper tube 15 is preferably prefabricated from rolled and welded copper sheet or else is in the form of a tubular part that is shaped by any appropriate machining technique.

The protective covering 16 is preferably made using a rotational molding technique, however other methods and in particular blow molding could be used, where appropriate. The covering 16 is slid while hot onto the copper tube 15, thereby providing sufficient clamping to ensure that it can no longer move relative to the tube, even when the tube is raised to the highest operating temperature of the splice.

The total length of the element 11 is adapted to the length of the element 12, and the two elements which constitute the protection device together have a length that matches that of the splice body.

Figure 3:
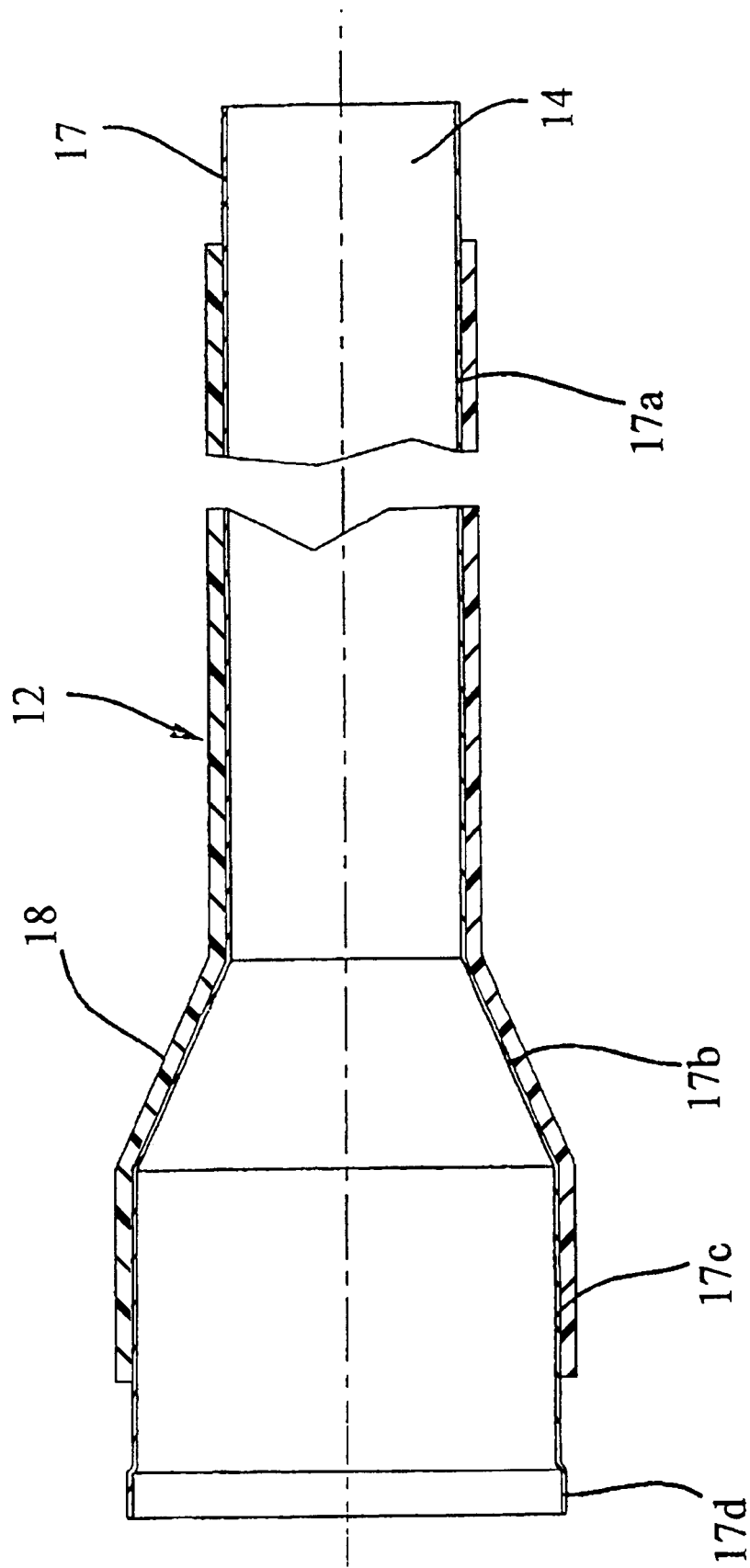
FIG. 3 is a section view on a larger scale of the second element of the FIG. 1 device.

As seen in FIG. 3, the element 12 is constituted by a copper tube and by a protective covering 18 made of insulating synthetic material which covers a portion of the tube 17. Like the element 11, this tube comprises a circular cylindrical portion 17a having a diameter equivalent to that of the cable 14, a conical portion 17b extending the portion 17a, and a circularly cylindrical portion 17c extending the conical portion 17b. The cylindrical portion 17c flares at its free end 17d, thereby enabling it to receive the free end of the larger-diameter cylindrical portion 15c of the element 11.

Like the element 11, the copper tube 17 of the element 12 is covered in a protective covering 18, preferably made by a rotational molding technique and that fits the shape of the copper tube 17 to which it binds in such a manner as to prevent any relative movement between the covering and the tube, even at the highest operating temperature of the splice.

The copper tube can be fabricated by forming or machining or by rolling up copper sheet that is then welded together.

The two elements are assembled and connected together by engaging one of the copper tubes 15 in the other 17 at the flare 17d, after which the two copper tubes are welded together. The two insulating coverings 16 and 18 are preferably connected together in leakproof manner by means of an extra piece 19 which forms a bridge overlying the zone where the two copper tubes 15 and 17 are welded together. This piece is preferably heat-sealed to the two insulating coverings. Nevertheless, it could equally well be stuck by means of adhesive or reconstituted on site using appropriate synthetic materials.

Figure 4:
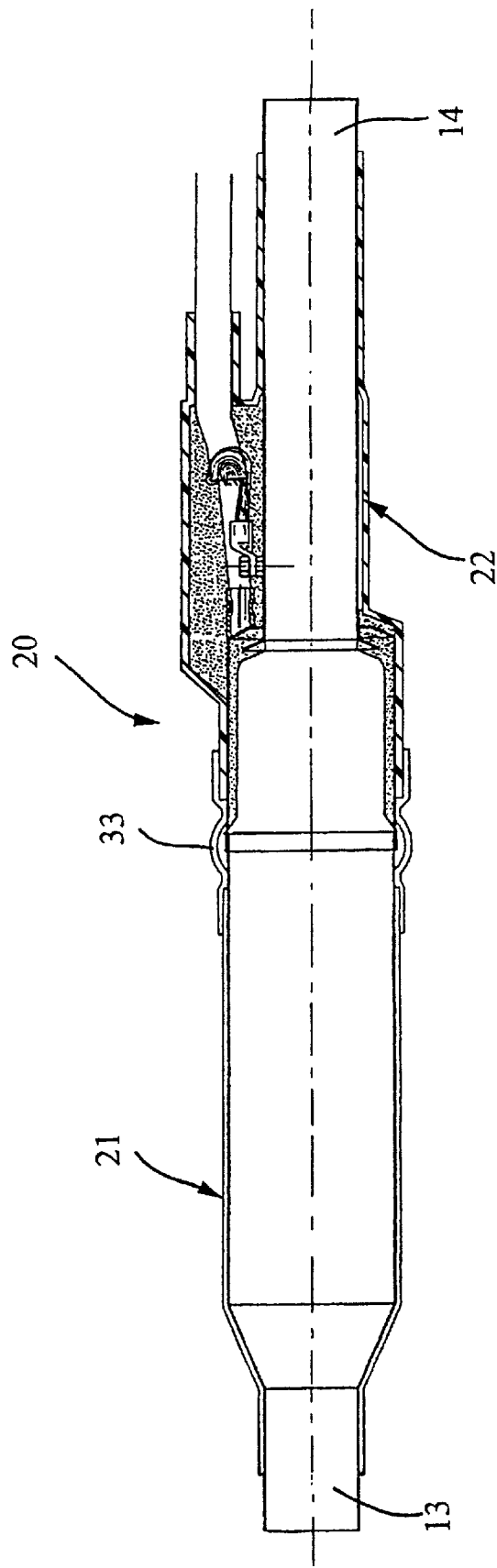
FIG. 4 is an overall view of a second embodiment of a leakproof protection device of the invention for a high voltage cable splice.
Figure 5:
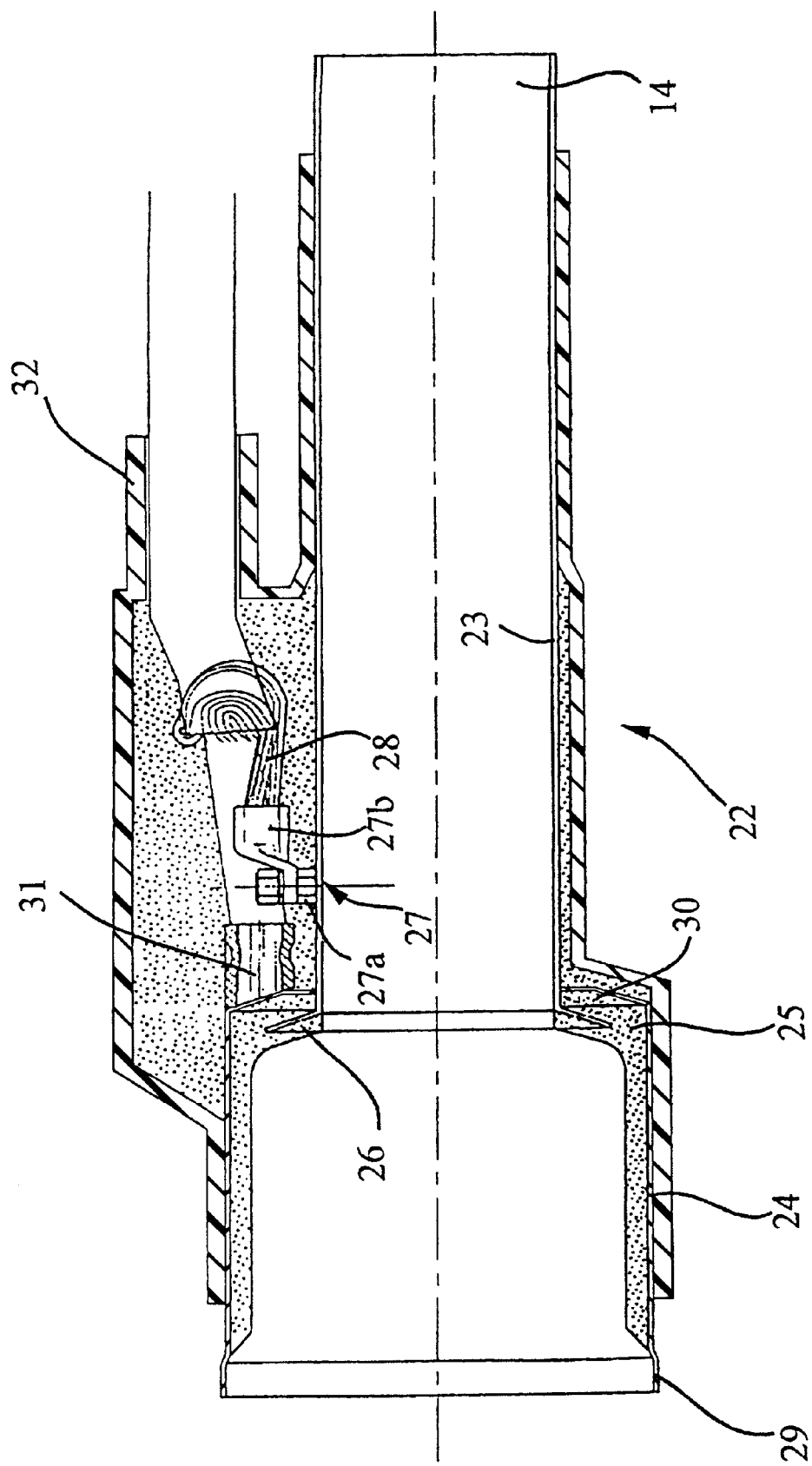
FIG. 5 is a section view on a larger scale of the second element of the FIG. 4 device.

FIG. 4 shows a variant embodiment of a leakproof protection device for a high voltage cable splice. In this variant, the device 20 mainly comprises two elements 21 and 22 that are assembled together and mounted respectively on the two cables 13 and 14 which are spliced together by means of a splice body (not shown). In this embodiment, the element 21 is identical to the element 11 as described above. However, the element 22 is different from the element 12. It is shown on a larger scale in FIG. 5. The element 22 comprises two cylindrical copper tubes 23 and 24 that are insulated from each other by a layer of molded synthetic material 25. These tubes are connected to one or two external cables by connection means incorporated in the element for the purpose of grounding them locally or of permutating the shields. The first tube 23 is of a diameter that matches the outside diameter of the cable 14 that is to be spliced, and its length is such that it protects the portion of the cable that needs to be stripped for engagement purposes before the operation of connecting together the conductors. At one of its ends, this tube is provided with an open conical extension 26. It is also fitted with means 27 for connecting one or two external cables 28. These connection means are constituted, for example, by a clamping screw 27a and by a cable clamp device 27b of conventional type. These connection means could also be provided by welding.

The diameter of the second tube 24 matches that of the splice body, which diameter is greater than that of the cable 14. One of its ends is terminated by a flare 29 for co-operating with the end of the copper tube of the element 21 so as to enable the two tubes to be superposed and welded together. Its other end is extended by a conical portion 30 going towards the axis of the device at the same angle as the open conical extension 26 of the first tube 23. It also includes means for connection to an external cable 31 of the cable clamp type or the like, for connecting to local ground or for permutating the shields. The two conical portions 26 and 30 of the two tubes 23 and 24 are superposed. The tubes 23 and 24 are preferably fabricated using rolled and welded metal sheet, but they could also be made by machining or by any other appropriate means.

The tubes are covered, at least in part, by an insulating covering 32 of synthetic material which is preferably made by rotational molding. As before, the covering is preferably slid while hot onto the copper tubes so that it provides sufficient binding to avoid any relative displacement.

The covering constitutes the mold for insulating filler material that constitutes the layer of molded synthetic material 25 and that also protects the shield connection system.

When the two elements 21 and 22 are mutually engaged, the welded connection zone between the two copper tubes is covered and protected by reconstituted insulation that may be constituted by an extra part 33 that is heat-sealed to the two insulating coverings associated with the two copper tube. This insulation may also be constituted by mastic taping and/or by a heat-shrink sheath.

Other variants derived from the embodiments described could also be developed. In particular, the number of metal tubes is not necessarily restricted to two and the cylindrical and conical segments of any one tube could, for example, be embedded in a mass of insulating material. The tubes could equally well be made of aluminum or of aluminum alloy.

What is claimed is:

1. A leakproof protection device of a high voltage cable joint, the device comprising a first prefabricated tubular composite element comprising a first tube and a first outer preformed covering secured to said first tube, wherein said first tube is metal;

a second prefabricated tubular composite element comprising a second tube and a second outer preformed covering secured to said second tube, wherein said second tube is metal;

wherein said first and second prefabricated elements have facing leakproof assembled ends, and are assembled together to form a mutual leakproof connection zone at said facing leakproof assembled ends;

wherein said first and second tubes of said assembled first and second prefabricated elements define a tubular structure of said leakproof protection device, and wherein said first and second outer preformed coverings are coupled together in said leakproof connection zone to define an outer insulating sheath of said leakproof protection device.

2. The leakproof protection device according to claim 1, wherein one of said first and second tubes has a flared portion at one end, and wherein an end of the other of said first and second tubes is inserted into said flared portion to be engaged therewith, thereby enabling said engaged ends of said first and second tubes to be sealed together in said connection zone.

3. The leakproof protection device according to claim 2, wherein said engaged ends of said first and second tubes are sealed together in said connection zone by a weld.

4. The leakproof protection device according to claim 2, wherein said first and second outer preformed coverings are coupled together by an extra part which covers an outer circumferential surface of said first and second outer preformed coverings in said leakproof connection zone in a leakproof manner.

5. The leakproof protection device according to claim 1, wherein the tubes are made of copper and are made using copper sheet that is rolled and welded.

6. The leakproof protection device according to claim 1, wherein said first and second outer preformed coverings are adapted to profiles of said first and second tubes, respectively, and are made of synthetic material by rotational molding.

7. The leakproof protection device according to claim 1, wherein said first and second outer preformed coverings are coupled together by an extra part which covers an outer circumferential surface of said first and second outer preformed coverings in said leakproof connection zone in a leakproof manner.

8. The leakproof protection device according to claim 1, wherein each of said first and second tubes comprises two opposite cylindrical segments having different diameters, one cylindrical diameter being larger than the other, and interconnected by a conical segment; and wherein said leakproof connection zone between said first and second prefabricated elements is at a terminal end of the cylindrical segment having the larger diameter of each of said first and second tubes.

9. The leakproof protection device according to claim 8, wherein for each of said first and second tubes, said two cylindrical segments have different lengths, and wherein the length of each cylindrical segment of said first tube is different than the length of each cylindrical segment of said second tube.

10. The leakproof protection device according to claim 1, wherein said first prefabricated element has said first tube, and wherein said first tube has two circularly cylindrical segments of different diameters with a conical segment therebetween; and wherein said second prefabricated element comprises said second tube and a third metal tube, both said second and third tubes being cylindrical, a diameter of said second tube being different from a diameter of said third tube, said second and third tubes being coupled to each other and insulated from each other, and both said second and third tubes carrying said second outer preformed covering of said second prefabricated element.

11. The leakproof protection device according to claim 8, wherein said second and third tubes of said second prefabricated element have ends facing each other, each of said facing ends having a conical extension at a same angle and leaving a space between them filled with insulating filler coupling material.

12. The leakproof protection device according to claim 10, wherein said second and third tubes of said second prefabricated element are respectively associated with means for connection to external cables for connecting each of said second and third tubes to a local ground for permutating shields.

* * * * *